United States Patent
Satoh et al.

[11] Patent Number: 5,670,953
[45] Date of Patent: Sep. 23, 1997

[54] DISTANCE CONTROL APPARATUS FOR VEHICLE

[75] Inventors: Hiroshi Satoh; Ikuhiro Taniguchi, both of Yokosuka, Japan

[73] Assignee: Nissan Motor Co., Ltd., Yokohama, Japan

[21] Appl. No.: 402,046

[22] Filed: Mar. 10, 1995

[30] Foreign Application Priority Data

Mar. 15, 1994 [JP] Japan ..................... 6-070038

[51] Int. Cl.⁶ .................................. G08G 1/16
[52] U.S. Cl. .............. 340/903; 340/904; 340/435; 340/436; 367/909; 342/70; 180/169; 180/170; 364/461
[58] Field of Search ................. 340/435, 436, 340/903, 904; 367/909; 342/70, 71; 180/167, 168, 169, 170, 271, 274; 364/460, 461

[56] References Cited

U.S. PATENT DOCUMENTS

| | | | |
|---|---|---|---|
| 4,101,870 | 7/1978 | Ekman | 340/903 |
| 5,295,551 | 3/1994 | Sukonick | 180/167 |
| 5,375,060 | 12/1994 | Nöker | 364/461 |
| 5,432,509 | 7/1995 | Kajiwara | 340/903 |

FOREIGN PATENT DOCUMENTS 42 09 060  9/1993  Germany.

*Primary Examiner*—Jeffery Hofsass
*Assistant Examiner*—Nina Tong
*Attorney, Agent, or Firm*—Foley & Lardner

[57] ABSTRACT

A distance control apparatus for a vehicle detects a vehicle speed and a distance to a preceding vehicle through a vehicle speed sensor and a distance measuring device. The distance control apparatus calculates two deceleration distances by a driver model calculating device and a vehicle model calculating device. The driver model calculating device calculates the deceleration distance on the basis of the vehicle speed and the distance to a preceding vehicle and with reference to a driver's control characteristics. The vehicle calculating device calculates the deceleration distance on the basis of the vehicle speed and with reference to physical characteristics of the vehicle. A speed control device of the distance control apparatus executes a deceleration control of the vehicle according to a larger one of the driver model deceleration distance and the vehicle model deceleration distance so as to realize the distance control fitting with a driver's feel to a distance while keeping a secure distance derived from vehicle characteristics.

4 Claims, 5 Drawing Sheets

DISTANCE CONTROL APPARATUS FOR VEHICLE

BACKGROUND OF THE INVENTION

1. Field of the Invention

The present invention relates to a distance control apparatus installed to a vehicle, and more particularly to an apparatus which automatically controls a distance between a subject vehicle and a preceding vehicle during traveling.

2. Description of the Prior Art

Japanese Patent Provisional Publication No. 3-280110 discloses a distance control apparatus which calculates an acceleration degree from a vehicle speed and a distance to a preceding vehicle, and automatically controls the acceleration of the vehicle on the basis of the acceleration degree during an automatic cruising. Furthermore, during a normal cruising where such automatic acceleration control is stopped, the distance to a preceding vehicle is detected for correcting various parameters for next automatic cruising by learning control.

However, such a conventional control apparatus is not arranged to directly change the distance upon taking into account the change of a driver's sense in various cases, for example, in the case that the preceding vehicle is accelerated or decelerated.

SUMMARY OF THE INVENTION

It is an object of the present invention to provide an improved distance control apparatus which controls a distance to a preceding vehicle so as to fit with a driver's sense of distance while ensuring a secure distance to the preceding vehicle.

A distance control apparatus according to the present invention is for a vehicle and comprises a vehicle speed detecting device which detects a vehicle speed of the vehicle and a distance measuring device which measures a distance between the vehicle and a preceding vehicle. A driver model calculating device calculates a driver model deceleration distance and a driver model acceleration distance from the vehicle speed and the distance and driver's operation characteristics. A vehicle model calculating device calculates a vehicle model deceleration distance from the vehicle speed and physical characteristics of the vehicle. A speed control device executes a deceleration control of the vehicle according to a larger one of the driver model deceleration distance and the vehicle model deceleration distance, and executes an acceleration control of the vehicle according to the driver model acceleration distance.

BRIEF DESCRIPTION OF THE DRAWINGS

In the drawings, like reference numerals designate like parts and elements throughout all figures; in which.

DETAILED DESCRIPTION OF THE INVENTION

Referring to FIGS. 1 to 5, there is shown a first embodiment of a distance control apparatus in accordance with the present invention. The distance control apparatus is applied to a vehicle and used for controlling a distance between a preceding vehicle and the vehicle.

Figure 1:
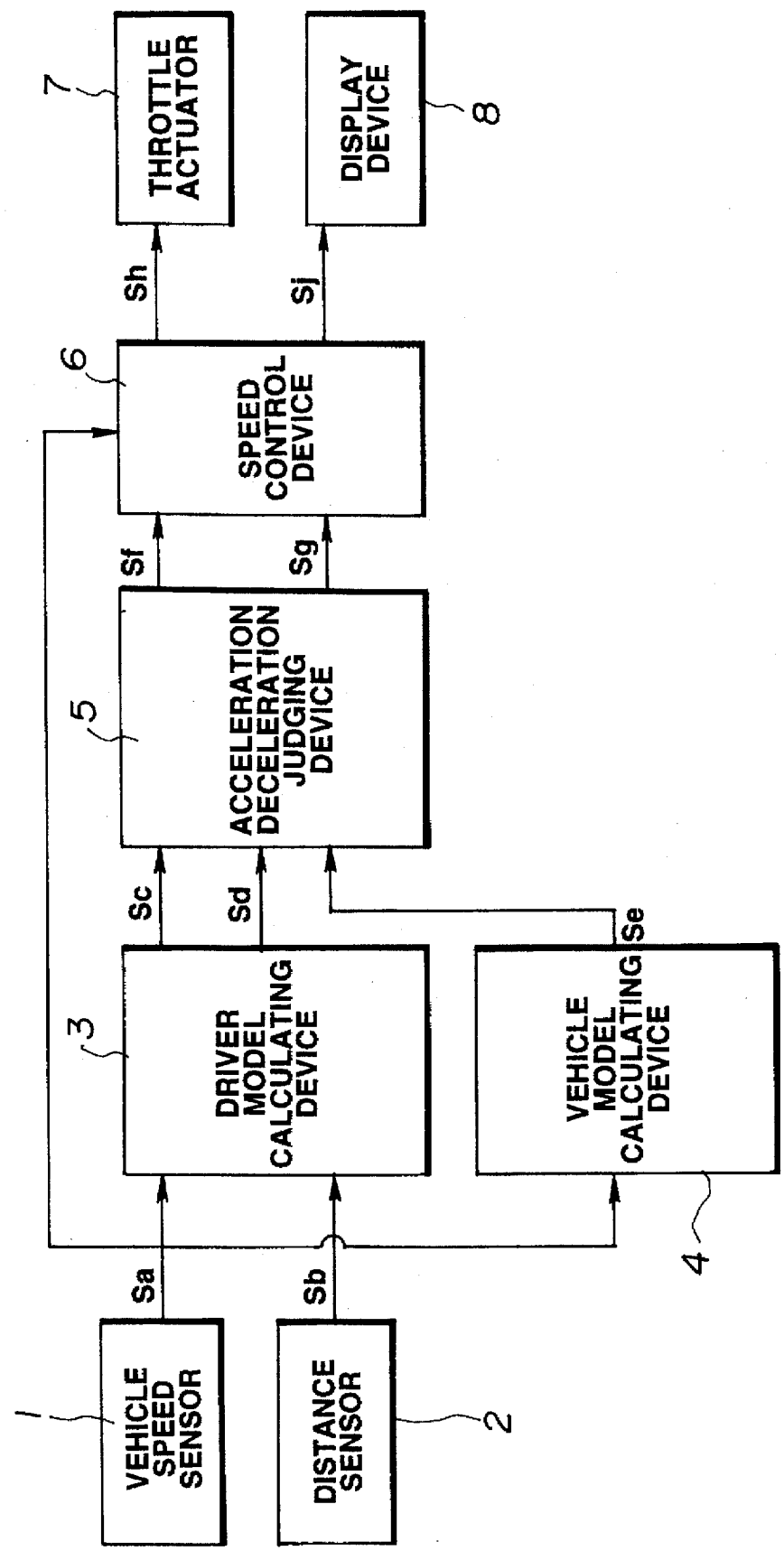
FIG. 1 is a block diagram which shows a construction of a first embodiment of a distance control apparatus according to the present invention.

As shown in FIG. 1, the distance control apparatus installed to the vehicle comprises a vehicle speed sensor 1 for detecting a vehicle speed of the vehicle and a distance measuring device 2 for measuring a distance from the vehicle to a preceding vehicle. These sensor 1 and device 2 are connected with a driver model calculating device 3. The speed sensor 1 is further connected with a vehicle model calculating device 4. The driver model calculating device 3 and the vehicle model calculating device 4 are connected with an acceleration deceleration judging device 5 which operates a throttle actuator 7 through a vehicle speed controlling device 6 and which operates a display device 8.

The vehicle speed sensor 1 detects a rotation speed of a wheel and outputs a vehicle speed signal Sa indicative of the vehicle speed to the driver model calculating device 3, the vehicle model calculating device 4 and the speed control device 6. The distance measuring device 2 is arranged to emit a laser beam toward the preceding vehicle and to receive the laser beam reflected by a preceding vehicle by means of a photo sensor. The distance measuring device 2 counts a time period from the emission of the laser beam to the receipt of the reflected laser beam, and calculates a distance between the preceding vehicle and the vehicle equipped with the apparatus. A distance signal Sb indicative of the measured distance is outputted from the distance measuring device 2 to the driver model calculating device 3.

The driver model calculating device 3 calculates a driver model acceleration distance on the basis of the driver's operation characteristics and according to the vehicle speed signal Sa and the distance signal Sb. The driver model acceleration distance is defined as a distance which is kept between the vehicle and a preceding vehicle when the driver of the vehicle starts the acceleration control of the vehicle. The driver model calculating device 3 outputs a driver model acceleration distance signal Sc indicative of the driver model acceleration distance to the acceleration deceleration judging device 5. Similarly, the driver model calculating device 3 calculates a driver model deceleration distance on the basis of the driver's operation characteristics and according to the vehicle speed signal Sa and the distance signal Sb. The driver model deceleration distance is defined as a distance which is kept between the vehicle and a preceding vehicle when the driver of the vehicle starts the deceleration control of the vehicle. The driver model calculating device 3 outputs a driver model deceleration distance signal Sd indicative of the driver model deceleration distance to the acceleration deceleration judging device 5.

The vehicle model calculating device 4 calculates a vehicle model deceleration distance on the basis of physical characteristics of the vehicle and according to the vehicle speed signal Sa. The vehicle model deceleration distance is defined as a distance which is the sum of a predetermined distance (2 or 3 m) and a distance to be run by the vehicle during a time from a start of the deceleration operation until the vehicle speed of the vehicle becomes the same as that of the preceding vehicle. The vehicle model calculating device 4 outputs a vehicle model deceleration distance signal Se indicative of the vehicle model deceleration distance to the acceleration deceleration judging device 5.

Upon receipt of the signals from the driver model calculating device 3 and the vehicle model calculating device 4, the acceleration deceleration judging device 5 determines according to these outputs Sc, Sd and Se as to whether the vehicle is accelerated, decelerated or kept on. When it is judged that the vehicle is to be accelerated, the distance represented by the driver vehicle model acceleration distance signal Sc is used as an acceleration distance practically. When it is judged that the vehicle is to be decelerated, the acceleration deceleration judging device 5 judges as to which of the distances represented by the signal Sd and the signal Se is larger and selects the larger signal between the signals Sd and Se as a distance where the deceleration control is started. The acceleration deceleration judging device 5 outputs an acceleration signal Sf or deceleration signal Sg to a speed control device 6 when the distance from the preceding vehicle becomes the same as the determined distance. The speed control device 6 outputs a drive signal Sh to a throttle actuator 7 so as to increase the opening degree of a throttle valve (though not shown) attached to an engine of the vehicle when the speed control device 6 receives the acceleration signal Sf from the acceleration deceleration judging device 5, and so as to decease the opening degree of the throttle valve when it receives the deceleration signal Sg. The speed control device 6 outputs a display signal Sj to the display device 8 which visually displays an operating condition of this control or informs this condition by means of sounds.

The manner of operation of the distance control apparatus according to the present invention will be discussed hereinafter.

First, when no preceding vehicle exists within a predetermined distance of the vehicle, the speed of the vehicle is kept at a predetermined value. When a preceding vehicle is running at a speed lower than that of the vehicle within the predetermined preceding distance, the driver model calculating device 3 calculates the driver model deceleration distance according to the vehicle speed signal Sa and the distance signal Sb. Furthermore, at this condition, the vehicle model calculating device 4 calculates the vehicle model deceleration distance according to the vehicle speed signal Sa.

The acceleration deceleration judging device 5 compares the driver model deceleration distance signal Sd and the vehicle model deceleration distance Se and selects a larger one thereof as a deceleration distance signal used in the speed control device 6. The acceleration deceleration judging device 5 outputs the deceleration signal Sg to speed control device 6 when the distance from the preceding vehicle becomes smaller than the deceleration distance determined in the acceleration deceleration judging device 5.

Upon receipt of the deceleration signal Sg the speed control device 6 outputs a drive signal Sh to the throttle actuator 7 to decelerate the vehicle by decreasing the opening degree of the throttle valve. Accordingly, the distance between the vehicle and the preceding vehicle is kept at a proper distance.

When the distance from the preceding vehicle becomes increasing, that is, when the distance measured by the distance measuring device 2 becomes larger than the acceleration distance calculated by the driver model calculating device 3, the acceleration deceleration judging device 5 outputs the acceleration signal Sf. Upon receipt of the acceleration signal Sf the speed control device 6 outputs a drive signal Sh to the throttle actuator 7 to accelerate the vehicle by increasing the opening degree of the throttle valve.

The calculating method of the controlled distance will be discussed hereinafter.

Figure 2:
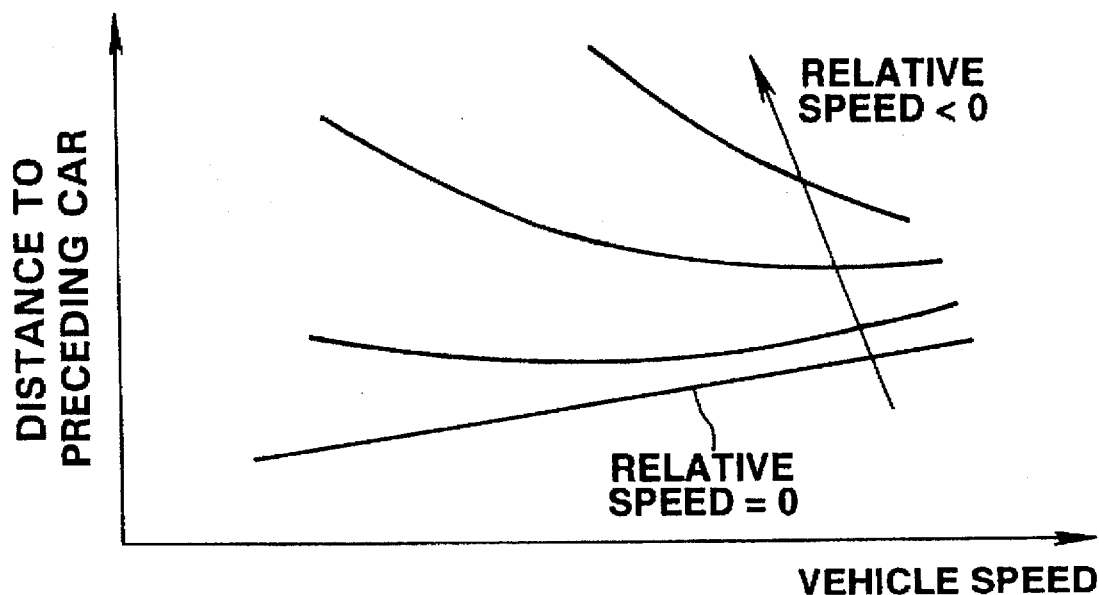
FIG. 2 is a graph which shows a relationship between a vehicle speed and a distance to a preceding vehicle with respect to a relative speed depending on a driver model.
Figure 3:
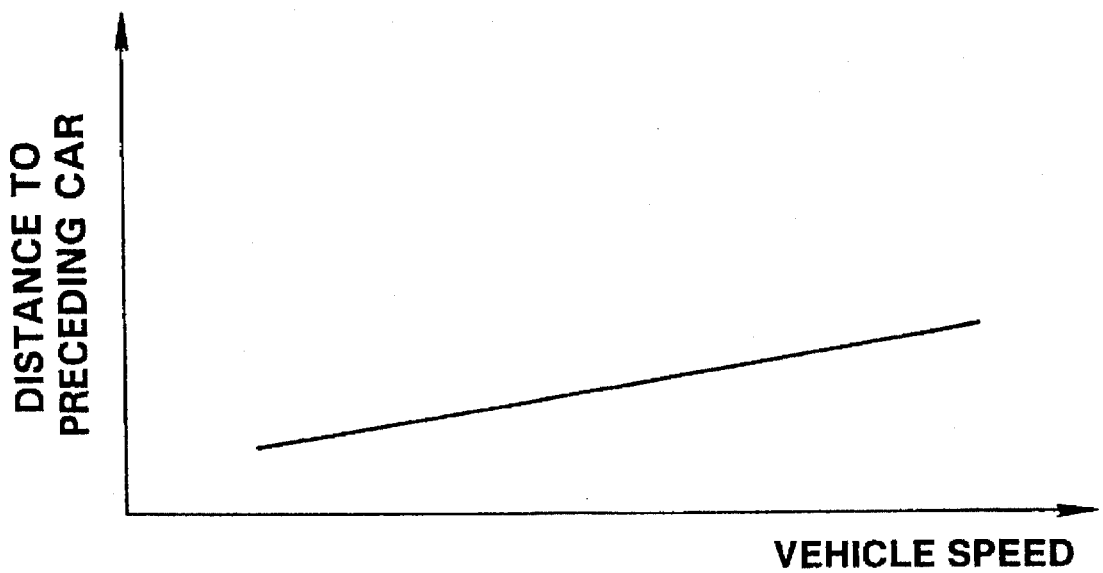
FIG. 3 is a graph which shows another relationship between the vehicle speed and the distance depending on a vehicle model.

FIGS. 2 and 3 show relationships between the vehicle speed and the distance from the preceding vehicle with respect to a relative speed between the preceding vehicle and the vehicle. In these graphs, the relative speed is a difference between the vehicle speed and a preceding vehicle, takes a minus value when the distance is decreasing, and takes a plus value when the distance is increasing. That is, the relative speed is a value obtained by subtracting the vehicle speed from a vehicle speed of a preceding vehicle. In other words, the relative speed can be expressed by a changing ratio of the distance between the vehicle and the preceding vehicle.

FIG. 2 shows a relationship between the vehicle speed and the distance to the preceding vehicle when a driver's intent to decelerate the vehicle is detected by the closing operation of the throttle valve. FIG. 3 shows a relationship between the vehicle speed and the distance when a driver's intent to accelerate the vehicle is detected by the opening operation of the throttle valve. Also, a relationship during a constant speed cruising, such as when there is no driver's intent to accelerate or decelerate the vehicle, becomes generally similar to the curve at the relative speed=0 in FIG. 2.

These relationships can be represented by the following equation:

$$\text{Deceleration distance} = A \times \text{vehicle speed} + B + \text{relative speed} \times \text{relative speed} + (C \times \text{vehicle speed}) \quad (1)$$

wherein A, B and C are constants and the relative speed is smaller than 0 (the relative speed <0).

$$\text{Acceleration distance} = A' \times \text{vehicle speed} + B' \quad (2)$$

wherein A' and B' are constants, the relative speed $\geq 0$.

As mentioned above, the driver model calculating device 3 obtains the vehicle speed and the relative speed form the signals Sa and Sb from the vehicle speed sensor 1 and the distance measuring device 2, and then calculates the driver model deceleration distance from the equation (1) or the driver model acceleration distance from the equation (2).

The calculation method of the vehicle model calculating device 4 will be discussed hereinafter.

Figure 4:
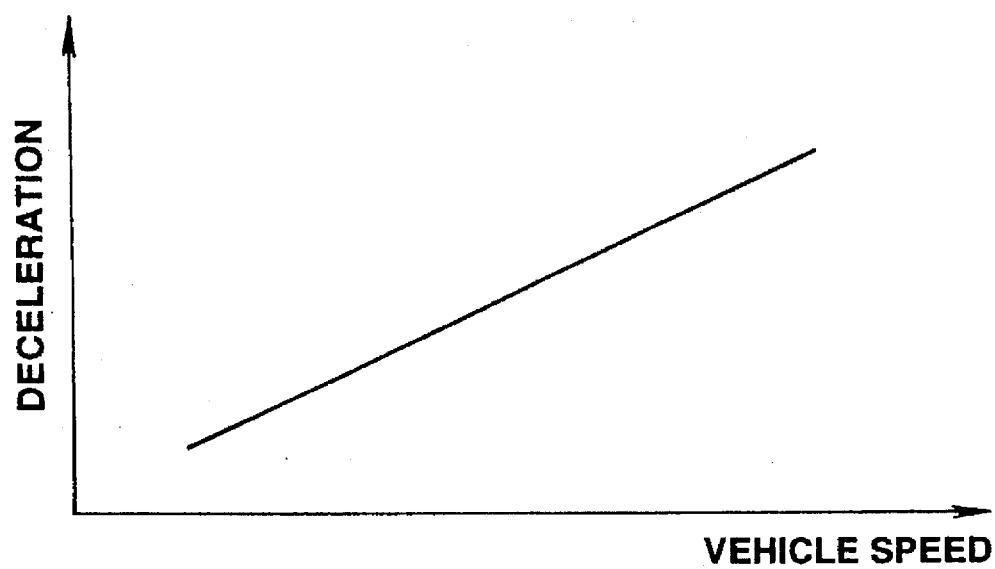
FIG. 4 is a graph which shows a relationship between deceleration and the vehicle speed when the vehicle is cruising on a flat and straight road.

FIG. 4 shows a measured result of the deceleration by the engine brake when the vehicle is running on a flat and straight road. This result can be represented by the following equation:

$$\text{Deceleration} = F \times \text{vehicle speed} \quad (3)$$

wherein F is constant.

When a deceleration distance is defined as a distance which is run by the vehicle applying the above deceleration until the vehicle speed of the vehicle becomes the same as that of the preceding vehicle, the deceleration distance can be represented by the following equation:

$$\text{Deceleration distance=relative speed} \times \text{relative speed} \div (2 \times \text{deceleration}) \quad (4)$$

The vehicle model deceleration distance is determined by adding an offset amount such as about 2 to 3 m to the deceleration distance of the equation (4). That is, the vehicle model deceleration distance is defined by the following equation:

$$\text{Vehicle model deceleration distance} = \text{deceleration distance} + G \quad (5)$$

wherein G is constant.

Figure 5:
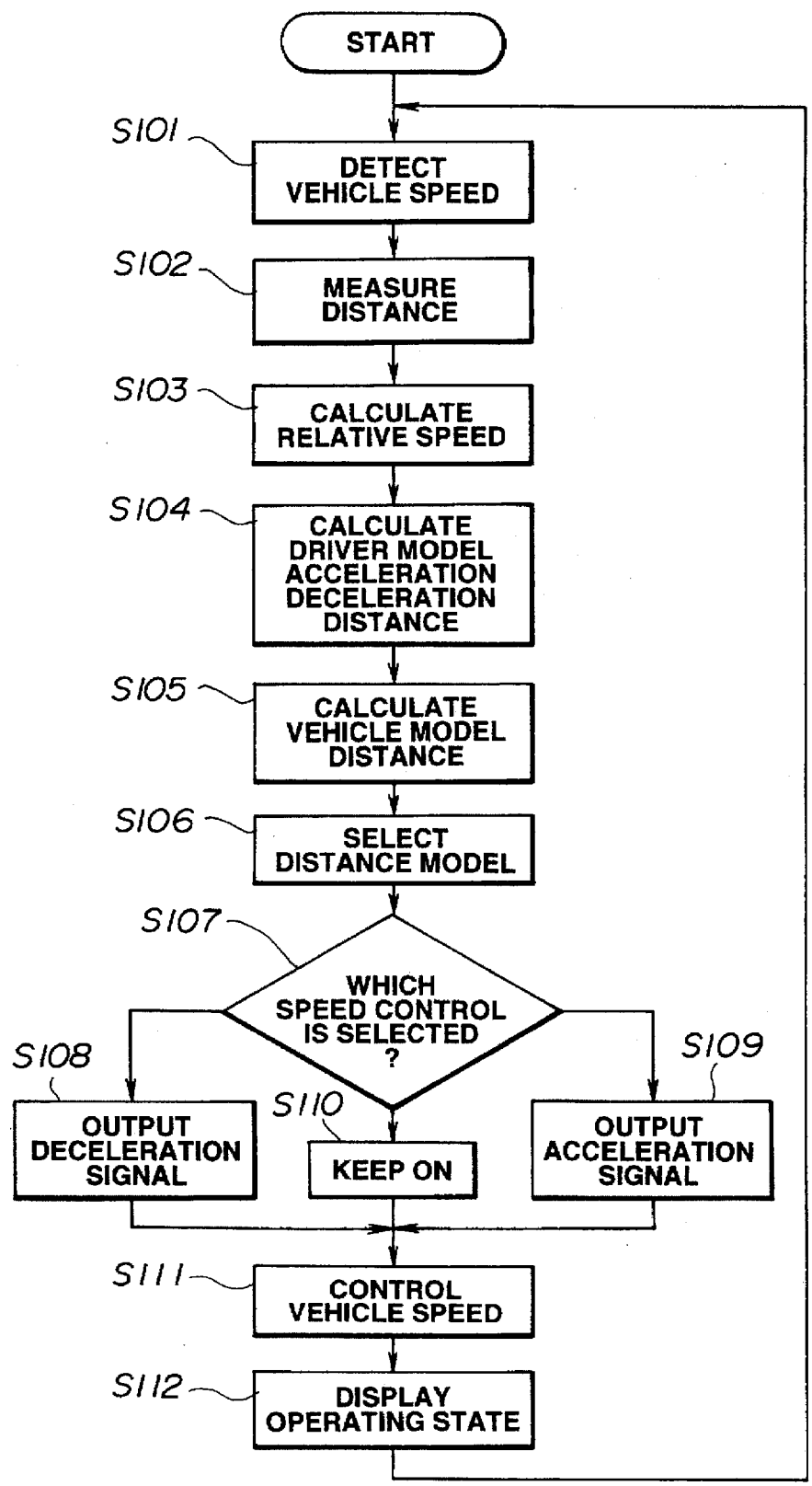
FIG. 5 is a flowchart which shows a distance control operation of the first embodiment.

The manner of control operation by the distance control apparatus according to the present invention will be discussed hereinafter with reference to a flowchart shown in FIG. 5.

First, in a step S101 the driver model calculating device 3 receives the vehicle speed signal Sa from the vehicle speed sensor 1. Next, in a step S102 the driver model calculating device 3 receives the distance signal Sb from the distance measuring device 2.

In a step S103 the driver model calculating device 3 calculates the relative speed between the vehicle and the preceding vehicle.

In a step S104 the driver model calculating device 3 calculates the driver model deceleration distance or the driver model acceleration distance by using the equation (1) or equation (2) on the basis of the drive operation characteristics of the driver.

In a step S105 the vehicle model calculating device 4 calculates the vehicle model deceleration distance by using the equation (5) on the basis of the physical characteristics of the vehicle.

In a step S106 the acceleration deceleration judging device 5 compares the value indicative of the driver model deceleration distance calculated by the driver model calculating device 3 and the value indicative of the vehicle model deceleration distance by the vehicle model calculating device 4, and selects the larger value as a deceleration distance.

In a step S107 the acceleration deceleration judging device 5 judges according to the calculated results of the driver model calculating device 3 and the vehicle model calculating device 4 as to whether the vehicle speed is increased, deceased or kept on. When the vehicle speed is decreased, the routine proceeds to a step S108 wherein the deceleration signal Sg is outputted to the speed control device 6. When the vehicle speed is increased, the routine proceeds to a step S109 wherein the acceleration signal Sf is outputted to the speed control device 6. When the vehicle speed is maintain, the routine proceeds to a step S110 wherein the speed control device 6 operates to keep on the vehicle speed as it was.

After implementation of either of the steps S108, S109 or S110, the routine proceeds to a step S111 wherein the speed control device 6 outputs the drive signal Sh to the throttle actuator 7 according to the deceleration signal Sg or the acceleration signal Sf in order to control the vehicle speed at a desired value.

In a step S112, the vehicle operating condition is informed to the driver through the display device 8.

With this first embodiment of the distance control apparatus, since the driver model calculating device and the vehicle model calculating device are provided, respectively, to calculate distances at which acceleration and deceleration of the vehicle is executed according to the driving operation characteristics of the driver and to calculate a distance at which deceleration of the vehicle is executed according to the physical characteristics of the vehicle, the distance between the subject vehicle and the preceding vehicle is properly controlled upon deceleration. Therefore, the driver feels proper acceleration and deceleration for controlling the distance even under various road conditions.

The third term in the equation (1) is in proportion with the deceleration distance derived from the equations (3) and (4) which distance was determined from the physical characteristics of the vehicle. That is, the third term corresponds to the deceleration distance where the driver decides to do deceleration of the vehicle. Accordingly, by obtaining the deceleration distance from the equation (1), the deceleration distance which includes the physical characteristics of the vehicle driven by the driver is obtained. This realizes the proper distance control fitting with the feeling of the driver.

Furthermore, since the deceleration for controlling the distance is started at a larger distance between the calculation result of the driver model calculating device 3 and the calculation result of the vehicle model calculating device 4, a close approach to the preceding vehicle is securely avoided.

Further, since during the distance control period the acceleration and the deceleration conditions and the running mode are informed to the driver through the display device 8, the reliability of the distance control apparatus is improved by supplying a comfort feeling to the driver.

Figure 6:
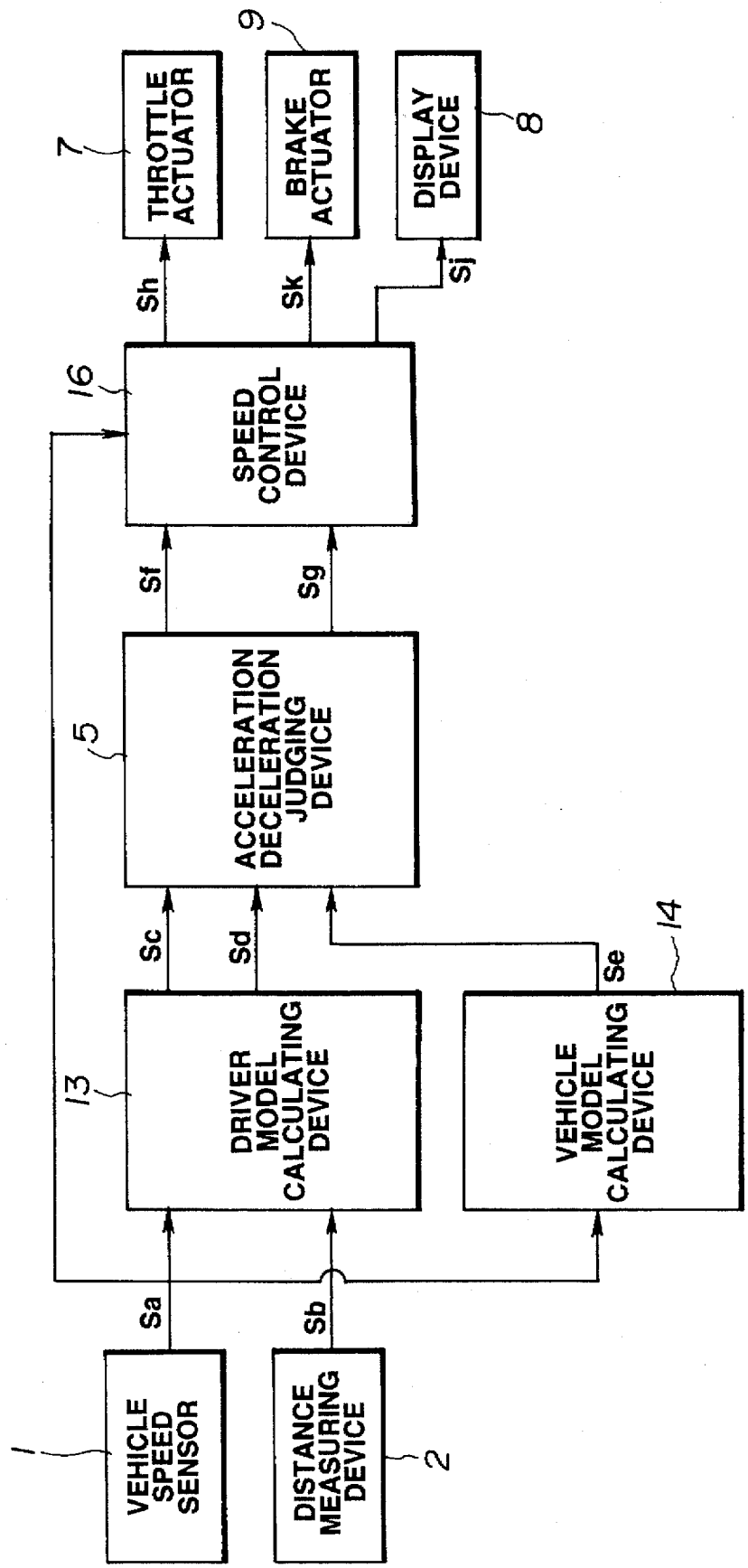
FIG. 6 is a block diagram of a second embodiment of the distance control apparatus according to the present invention.

FIG. 6 shows a second embodiment of the distance control apparatus according to the present invention. The second embodiment further comprises a brake actuator 9 through which a service brake (foot brake) is operated. The brake actuator 9 is connected with the speed control device 16 as shown in FIG. 6. Furthermore, a driver model calculating device 13 and a vehicle model calculating device 14 calculate the driver model deceleration distance and the vehicle model deceleration distance, respectively, upon taking the braking operation into account. The other construction of the second embodiment is the same as that of the first embodiment.

The calculating method of the driver model calculating device 13 will discussed hereinafter.

Figure 7:
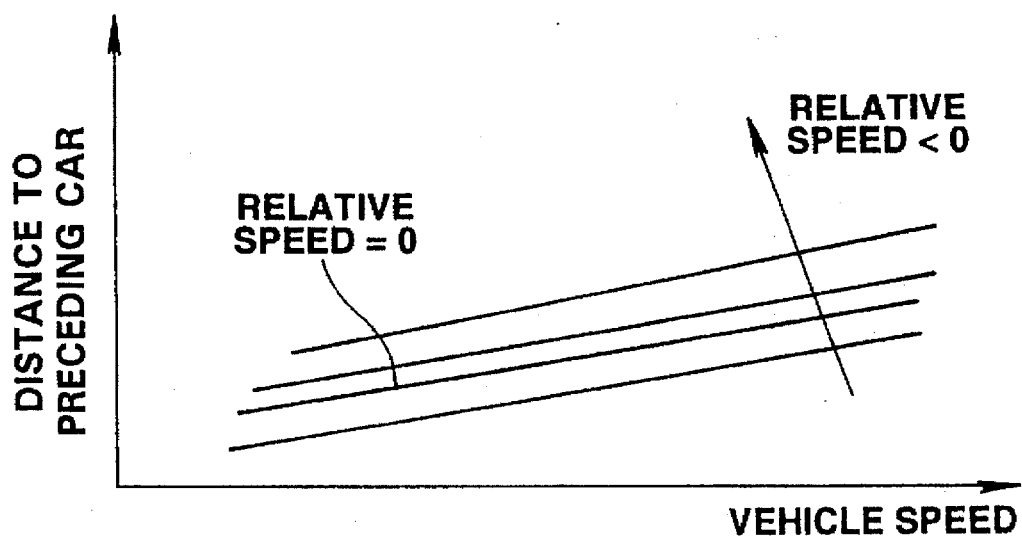
FIG. 7 is a graph which shows a relationship between the vehicle speed and the distance when the driver is implementing a braking operation.

FIG. 7 shows a relationship (experimental result) between the vehicle speed and the distance to the preceding vehicle with respect to the relative speed between the preceding vehicle and the vehicle when the driver carries out the braking operation of the service brake (foot brake).

On the basis of the relationship shown in FIG. 7, an approximate equation indicative of this relationship is derived. The deceleration distance, in case that the braking operation is carried out, is calculated from the following equation. Further, the calculated value is outputted as a deceleration distance signal Sd to the acceleration deceleration judging device 5.

$$\text{Deceleration distance} = A'' \times \text{vehicle speed} + B'' + (D \times |\text{relative speed}| - E) \quad (6)$$

Wherein A", B", D and E are constants, and the relative speed<0.

In this second embodiment, the vehicle model calculating device 14 uses a maximum deceleration caused by the braking operation of the service brake for calculating the vehicle deceleration distance. The deceleration distance, which is a distance that the vehicle running distance from the start of the deceleration until the vehicle speed becomes the same as that of the preceding vehicle, is derived from the equation (4). Furthermore, the vehicle model deceleration distance of this second embodiment is derived by adding a predetermined offset amount to the deceleration distance as is similar to that in the first embodiment. The vehicle model calculating device 14 outputs the vehicle model deceleration distance signal Se.

The acceleration deceleration judging device 5 compares the driver model deceleration distance signal Sd and the vehicle model deceleration distance Se, and selects the larger one thereof as a deceleration distance signal. The acceleration deceleration judging device 5 outputs the deceleration signal Sg to the speed control device 6 when the distance from the preceding vehicle becomes smaller than the deceleration distance determined in the acceleration deceleration judging device 5.

Upon receipt of the deceleration signal Sg, the speed control device 6 outputs a drive signal Sh to the throttle actuator 7 to decelerate the vehicle by decreasing the opening degree of the throttle valve, and outputs the drive signal Sk to the brake actuator 0 to decelerate the vehicle by operating the service brake. Accordingly, the distance between the vehicle and the preceding vehicle is kept at a proper distance.

When the distance to the preceding vehicle becomes increasing, that is, when the distance measured by the distance measuring device 2 becomes larger than the acceleration distance calculated by the driver model calculating device 3, the acceleration deceleration judging device 5 outputs the acceleration signal Sf. Upon receipt of the acceleration signal Sf, the speed control device 6 outputs a drive signal Sh to the throttle actuator 7 to accelerate the vehicle by increasing the opening degree of the throttle valve.

With this second embodiment, superior effects as is the same as that of the first embodiment are obtained. Furthermore, since the service brake is aggressively applied for deceleration, a responsibility for increasing the distance becomes considerably high and the driver obtains a further comfort feeling during the cruising.

Although the preferred embodiments of the present invention have been described, it is to be understood that modifications will be apparent to those skilled in the art without departing from the sprit of the invention. For example, while the distance measuring device 2 has been described to utilize a reflection of a laser beam, it will be understood that it may utilize a reflected wave by using an electric wave or an ultrasonic wave, and may be a type which measures a distance from the visual image data.

Further, the driver model calculating device 3 (13) and the vehicle model calculating device 4 (14) may comprise a cruising environment detector which detects environmental condition such as the weather, day or night, a steering angle, a vehicle weight and the like in order to correct the constants of the above-mentioned equations. Additionally, the driver model calculating device 3 (13) and the vehicle model calculating device 4 (14) may be arranged to calculate the deceleration on the basis of a running resistance which is estimated from the opening degree of the throttle valve, the engine speed, a transmission gear ratio, the vehicle speed and the like. Furthermore, the speed control device 6 (16) may be arranged to control an automatic transmission actuator for transmitting the gear ratio of an automatic transmission. This enables the shift position to be properly selected so as to keep silent and smooth cruising and an engine brake to be effectively operated.

What is claimed is:

1. A distance control apparatus for a vehicle comprising:
   a self vehicle speed detecting means for detecting a vehicle speed of the vehicle;
   a distance measuring means for measuring a distance between the vehicle and a preceding vehicle;
   a driver model calculating means for calculating a driver model deceleration distance and a driver model acceleration distance from the vehicle speed and the distance and a driver's control characteristics;
   a vehicle model calculating means for calculating a vehicle model deceleration distance from the vehicle speed and physical characteristics of the vehicle; and
   a control means for executing a deceleration control of the vehicle according to a larger one of the driver model deceleration distance and the vehicle model deceleration distance and for executing an acceleration control of the vehicle according to the driver model acceleration distance;
   wherein a driver model deceleration distance is calculated by the following equation:

Driver model deceleration distance=A×vehicle speed+B +relative speed×relative speed÷(C×vehicle speed)

wherein A, B and C are constants, and the relative speed is a value obtained by subtracting the vehicle speed from a vehicle speed of a preceding vehicle and is smaller than 0.

2. A distance control apparatus for a vehicle, comprising:
   a self vehicle speed detecting means for detecting a vehicle speed of the vehicle;
   a distance measuring means for measuring a distance between the vehicle and a preceding vehicle;
   a driver model calculating means for calculating a driver model deceleration distance and a driver model acceleration distance from the vehicle speed and the distance and a driver's control characteristics;
   a vehicle model calculating means for calculating a vehicle model deceleration distance from the vehicle speed and physical characteristics of the vehicle; and
   a control means for executing a deceleration control of the vehicle according to a larger one of the driver model deceleration distance and the vehicle model deceleration distance and for executing an acceleration control of the vehicle according to the driver model acceleration distance;
   wherein the driver model acceleration distance is calculated by the following equation:

Driver model acceleration distance =A'×vehicle speed +B' wherein A' and B' are constants.

3. A distance control apparatus for a vehicle, comprising:
   a self vehicle speed detecting means for detecting a vehicle speed of the vehicle;
   a distance measuring means for measuring a distance between the vehicle and a preceding vehicle;
   a driver model calculating means for calculating a driver model deceleration distance and a driver model acceleration distance from the vehicle speed and the distance and a driver's control characteristics;
   a vehicle model calculating means for calculating a vehicle model deceleration distance from the vehicle speed and physical characteristics of the vehicle; and
   a control means for executing a deceleration control of the vehicle according to a larger one of the driver model deceleration distance and the vehicle model deceleration distance and for executing an acceleration control of the vehicle according to the driver model acceleration distance;

wherein the vehicle model deceleration distance is calculated by the following equation:

$$\text{Deceleration} = F \times \text{vehicle speed}$$

$$\text{Deceleration distance} = \text{relative speed} \times \text{relative speed} \div (2 \times \text{deceleration})$$

$$\text{Vehicle model deceleration distance} = \text{deceleration distance} + G$$

wherein F and G are constants and the relative speed is a value obtained by subtracting the vehicle speed from a vehicle speed of a preceding vehicle and is smaller than 0.

4. A distance control apparatus for a vehicle, comprising:

a self vehicle speed detecting means for detecting a vehicle speed of the vehicle;

a distance measuring means for measuring a distance between the vehicle and a preceding vehicle;

a driver model calculating means for calculating a driver model deceleration distance by the following equation:

$$\text{Driver model deceleration distance} = A \times \text{vehicle speed} + B + \text{relative speed} \times \text{relative speed} + (C \times \text{vehicle speed})$$

wherein A, B and C are constants, and the relative speed is a value obtained by subtracting the vehicle speed from a vehicle speed of a preceding vehicle and is smaller than 0;

a vehicle model calculating means for calculating a vehicle model deceleration distance by the following equations:

$$\text{Deceleration} = F \times \text{vehicle speed} \quad \text{Deceleration distance} = \text{relative speed} \times \text{relative speed} \div (2 \times \text{deceleration})$$

$$\text{Vehicle model deceleration distance} = \text{deceleration distance} + G$$

wherein F and G are constants;

a control means for executing a deceleration control of the vehicle according to a larger one of the driver model deceleration distance and the vehicle model deceleration distance.

* * * * *